UNITED STATES PATENT OFFICE.

CHARLES F. BURGESS, OF MADISON, WISCONSIN, ASSIGNOR TO BURGESS BATTERY COMPANY, OF MADISON, WISCONSIN, A CORPORATION OF WISCONSIN.

MANUFACTURE OF DRY CELLS.

1,305,252.   Specification of Letters Patent.   Patented June 3, 1919.

No Drawing.   Application filed October 20, 1917. Serial No. 197,555.

*To all whom it may concern:*

Be it known that I, CHARLES F. BURGESS, a citizen of the United States, residing at Madison, in the county of Dane, State of Wisconsin, have invented certain new and useful Improvements in the Manufacture of Dry Cells, (Case III;) and I do hereby declare the following to be a full, clear, and exact description of the invention, such as will enable others skilled in the art to which it appertains to make and use the same.

The present invention relates to Leclanché cells of the type commonly designated as "dry cells," and is directed more particularly to an improved depolarizing mix wherein manganese dioxid is an important element.

It is a common practice to employ manganese dioxid as one of the important ingredients of these cells, this material, often designated merely as "manganese," being mixed with carbonaceous material such as graphite, carbon or the like, to serve as an envelop for the carbon electrode of the cell and yielding oxygen to lessen polarization when the cell is in action. The material which has been the standard for this work has been the high grade pyrolusite ore obtained from Russia, and analyzing about 85% $MnO_2$, and less than 1% of iron. This material has usually been ground to a 20-mesh size, or finer, before using.

I have found that the ampere hour capacity of a dry cell is dependent not only on the percentage of $MnO_2$ in the depolarizing material, but also upon the physical condition of this material. A hard, dense ore gives less satisfactory results than a softer, porous material of the same fineness, and same percentage of $MnO_2$, and I have discovered a method of treating manganese oxid ores preparatory to use in dry cells, whereby their efficiency as a dry cell material is very much increased, and whereby materials which have not heretofore been regarded as suitable can be made to give good results.

The process of my present invention comprises an electrolytic treatment of manganese oxid ore to convert some of its manganese dioxid to a lower oxid, and this is accompanied or followed by a treatment with a suitable solvent to dissolve out said lower oxid and leave a porous residue of relatively pure manganese dioxid. The electrolytic treatment of the manganese dioxid may be regarded as a preliminary step and may be effected by grinding the ore to a 20-mesh size or finer, intimately mixing it with a carbonaceous material, such as carbon, graphite, or a mixture of the two, arranging the mix so formed in contact with a carbon electrode, and then with an electrolyte of sal ammoniac-zinc chlorid such as is used in dry batteries, passing current to the carbon electrode through the mix, thereby liberating hydrogen in the mix, where in nascent condition it produces the desired partial reduction of the manganese dioxid to a lower oxid. The mix, after treatment as above described, may then be broken up and leached with water to recover the sal ammoniac-zinc chlorid electrolyte, and then treated for removal of the lower oxid to leave the manganese dioxid (mixed with carbonaceous material) in a more porous condition than before the treatment.

The treatment for removal of the lower oxid may be effected with an aqueous solvent and preferably is effected with a dilute mineral acid, such as 10% sulfuric acid, or an equivalent solution of niter cake ($NaHSO_4$), or 5% hydrochloric acid. The lower oxids of manganese are more soluble than manganese dioxid and so pass into solution as chlorids, if hydrochloric acid is used, or as sulfates, if sulfuric acid or niter cake is used, so that on washing and drying the residue there is obtained a relatively pure or high grade manganese dioxid intimately associated with the carbonaceous material such as carbon or graphite. If impurities are present, such as arsenic, antimony, nickel, chromium, cobalt or copper, they will be removed by the solvent and their removal will increase the porosity of the residue and at the same time improve its quality.

The individual grains of manganese dioxid are porous and each grain presents an enormous total area exposed for contact with the carbonaceous material and with the electrolyte when the mixture is assembled for use in a dry cell.

When using a mineral acid solution as above stated for this treatment, I find that purification is substantially complete after agitation with the solvent for about 1 to 8 hours. The treatment can be carried on at room temperature or can be hastened by heating.

In following the procedure above outlined, I may start with high grade Russian manganese or with the lower grade manganese oxid ores obtainable from various domestic sources and from Brazil, Cuba and elsewhere, and under the term "ores", as used herein, I mean to include manganese oxid materials recovered or obtainable as by-products in the industrial arts; but I prefer to start with manganese dioxid ores that have received the preliminary electrolytic treatment, whereby some of the manganese dioxid has been reduced to a lower oxid through the action thereon of hydrogen. This I am able to do by making use of the materials to be found in worn out dry cells which I am able to buy at low cost from junk dealers. Such cells, when torn apart, yield a mixture of manganese dioxid and carbonaceous material wherein a suitable proportion of the manganese dioxid has been reduced to a lower oxid so that on removing and recovering the electrolyte, and subsequent treatment with acid to dissolve out the lower oxids (and other impurities, if any are present), there is produced an intimate mixture of highly porous and relatively pure manganese dioxid intimately associated with carbonaceous material of good quality, and this mixture when used in dry cells, gives very satisfactory results. I attribute the good results to the high porosity of the manganese dioxid and to the intimacy of its contact with the electrolyte, and with the carbonaceous material, but other factors may contribute to the good results actually obtained in practice.

In making dry cells out of manganese oxid ore rendered porous by electrolytic reduction and subsequent acid treatment, and intimately mixed with carbonaceous material, such as graphite or carbon or a mixture of graphite and carbon, I proceed according to well known methods, using an electrolyte of sal ammoniac-zinc chlorid and assembling the mixture between the zinc and carbon electrodes of the cell according to standard practices.

I claim:

1. The method which consists in treating with a solvent the impure manganese dioxid of worn out dry cells, thereby to dissolve out impurities and render the dioxid porous and suitable for use with carbonaceous material as the depolarizing mix of a dry cell.

2. The method of regenerating the partially deoxidized depolarizing mix of a worn out dry cell which consists in treating the mix with a mineral acid solution to dissolve out as sulfates impurities contained in the mixture and to render the dioxid porous and the mixture suitable for use as the depolarizing mix of a dry cell.

3. The method of regenerating the partially deoxidized depolarizing mix of a worn out dry cell which consists in treating the mix with a dilute solution of sulfuric acid, to dissolve out impurities and thereby render said dioxid porous and said mixture suitable for use as the depolarizing mix of a dry cell.

4. The method which consists in subjecting a mixture of manganese dioxid and carbonaceous material to the reducing action of hydrogen until some of the dioxid is reduced to lower oxid, and dissolving out said lower oxid to purify said mixture and render it suitable for use as the depolarizing mix of a dry cell.

5. The method of regenerating the partially deoxidized depolarizing mix of a worn out dry cell, which consists in subjecting said mix to a dilute acid and dissolving out the impurities and rendering said dioxid porous and said mixture suitable for use as a depolarizing mix, substantially as described.

6. The method of regenerating the partially deoxidized depolarizing mix of a worn out dry cell, which consists in washing the mix to remove the electrolyte, treating with dilute mineral acid to dissolve out the lower oxid and render the dioxid porous, then washing and drying the purified mixture, substantially as described.

In testimony whereof I affix my signature.

CHARLES F. BURGESS.